United States Patent
Vannithamby et al.

(10) Patent No.: US 10,285,113 B2
(45) Date of Patent: May 7, 2019

(54) DIFFERENTIATING FIXED DEVICES FROM MOBILE DEVICES IN MOBILE BROADBAND NETWORKS

(75) Inventors: Rath Vannithamby, Portland, OR (US); Maruti Gupta, Portland, OR (US); Ali T. Koc, Hillsboro, OR (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 13/994,474

(22) PCT Filed: Nov. 14, 2011

(86) PCT No.: PCT/US2011/060505
§ 371 (c)(1),
(2), (4) Date: Jun. 14, 2013

(87) PCT Pub. No.: WO2012/134545
PCT Pub. Date: Oct. 4, 2012

(65) Prior Publication Data
US 2013/0265904 A1    Oct. 10, 2013

Related U.S. Application Data

(60) Provisional application No. 61/471,042, filed on Apr. 1, 2011.

(51) Int. Cl.
*H04L 9/08*          (2006.01)
*H04W 72/04*         (2009.01)
(Continued)

(52) U.S. Cl.
CPC .......... *H04W 48/10* (2013.01); *H04B 7/0456* (2013.01); *H04B 7/0486* (2013.01); *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01);
(Continued)

(58) Field of Classification Search
CPC ........ H04W 4/005; H04W 36/24; H04W 8/16
See application file for complete search history.

(56) References Cited

U.S. PATENT DOCUMENTS

2003/0093441 A1*   5/2003   Cooke ............... G06F 17/30575
2003/0198198 A1*  10/2003   Echavarri et al. ............ 370/328
(Continued)

FOREIGN PATENT DOCUMENTS

CN      101981967 A     2/2011
WO      2003063535 A1   7/2003

OTHER PUBLICATIONS

PCT International Search Report and Written Opinion issued in corresponding PCT/US2011/060505 dated May 30, 2012, (10 pages).
(Continued)

*Primary Examiner* — Asad M Nawaz
*Assistant Examiner* — Jason A Harley
(74) *Attorney, Agent, or Firm* — Trop Pruner & Hu, P.C.

(57) ABSTRACT

Fixed devices may be distinguished from mobile devices in a broadband wireless network. Fixed devices may be given an identifier that identifies the device as a fixed device.

29 Claims, 4 Drawing Sheets

(51) Int. Cl.

| | | |
|---|---|---|
| H04W 8/26 | (2009.01) | |
| H04W 48/10 | (2009.01) | |
| H04B 7/0456 | (2017.01) | |
| H04B 7/06 | (2006.01) | |
| H04L 5/00 | (2006.01) | |
| H04L 25/02 | (2006.01) | |
| H04L 25/03 | (2006.01) | |
| H04L 12/26 | (2006.01) | |
| H04L 12/721 | (2013.01) | |
| H04L 29/06 | (2006.01) | |
| H04W 24/00 | (2009.01) | |
| H04W 24/02 | (2009.01) | |
| H04W 24/10 | (2009.01) | |
| H04W 28/08 | (2009.01) | |
| H04W 48/12 | (2009.01) | |
| H04W 52/02 | (2009.01) | |
| H04W 52/14 | (2009.01) | |
| H04W 52/18 | (2009.01) | |
| H04W 4/70 | (2018.01) | |
| H04W 72/00 | (2009.01) | |
| H04W 88/02 | (2009.01) | |
| H04W 88/08 | (2009.01) | |
| H04W 92/20 | (2009.01) | |
| H04W 28/04 | (2009.01) | |

(52) U.S. Cl.
CPC ............ *H04W 4/70* (2018.02); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 28/04* (2013.01); *H04W 72/00* (2013.01); *H04W 88/02* (2013.01); *H04W 88/08* (2013.01); *H04W 92/20* (2013.01); *Y02D 70/00* (2018.01); *Y02D 70/164* (2018.01); *Y02D 70/21* (2018.01); *Y02D 70/444* (2018.01)

(56) References Cited

U.S. PATENT DOCUMENTS

| | | | | |
|---|---|---|---|---|
| 2004/0219908 A1* | 11/2004 | Ganor | | 455/422.1 |
| 2006/0104247 A1* | 5/2006 | Dommety | H04L 29/12216 | 370/338 |
| 2007/0064731 A1* | 3/2007 | Mizutani | H04L 12/5695 | 370/468 |
| 2007/0189502 A1* | 8/2007 | Hidaka | H04M 1/2745 | 379/355.01 |
| 2009/0111476 A1* | 4/2009 | Hamalainen | H04W 72/02 | 455/450 |
| 2010/0057485 A1 | 3/2010 | Luft | | |
| 2010/0238909 A1* | 9/2010 | Kim | H04W 8/26 | 370/336 |
| 2010/0240356 A1* | 9/2010 | Lee | H04W 36/32 | 455/422.1 |
| 2012/0008627 A1* | 1/2012 | Chen | H04L 29/12264 | 370/392 |

OTHER PUBLICATIONS

Cha, J., et al., "Device ID and Group ID for M2M Devices," IEEE 802.16 Broadband Wireless Access Working Group, IEEE 802.16p-11/0019, Mar. 6, 2011 (20 pages).

Kim, J., et al., "Group Based ID Allocation for M2M System," IEEE 802.16 Broadband Wireless Access Working Group, IEEE C802.16-10/0019, Dec. 30, 2010 (4 pages).

Lee, J., et al., "Small Data Transmission for fixed M2M devices in idle mode," IEEE 802.16 Broadband Wirless Access Working Group, IEEE C802.16p-11/0031, Mar. 6, 2011 (4 pages).

CN Office Action issued in corresponding CN application No. 201180069902.5 dated Dec. 3, 2015.

CN Office Action issued in corresponding CN application No. 201180069902.5 dated Aug. 3, 2016.

CN Office Action issued in corresponding CN application No. 201180069902.5 dated Feb. 3, 2017.

EP Search Report issued in corresponding EP application No. 11862181.2 dated Feb. 4, 2015.

"3rd Generation Partnership Project; Technical Specification Group Services and System Aspects; Study on Facilitating Machine to Machine Communication in 3GPP Systems; ( Release 8)". 3GPP Standard; 3GPP TR 22.868. 3rd Generation Partnership Project (3GPP). Mobile Competence Centre, 650, Route Des Lucioles, F-06921 Sophia-Antipolis Cedex, France, No. V8.0.0, Mar. 1, 2007 (Mar. 1, 2007), pp. 1-15, XP050361381, p. 11, lines 17-21.

Rui Huang et al: "Title Proposed text for addressing of STID Addressing Scheme in IEEE 802.16p system Date Submitted Source(s)", Mar. 3, 2011 (Mar. 3, 2011). XP055164924. Retrieved from the Internet: URL:http://ieee802.org/16/m2mjcontrib/C802 16p-11 0014.doc [retrieved on Jan. 26, 2015], p. 2, lines 11-13; figure 1.

Jeongki Kim et al: "Group based ID allocation for M2M system; C80216p-10 0019", IEEE Draft; C80216P-10 0019, IEEE-SA. Piscataway. NJ USA., vol. 1 • 802.16p, Dec. 30, 2010 (Dec. 30, 2010), pp. 1-4, XP017780489, [retrieved on Dec. 31, 2010], p. 2. lines 8-10; figures 1,2.

"Title Shared-STID Addressing Scheme Date Submitted Source(s) Ming-Hung Tao, Ying-Chuan Hsiao ITRI", Mar. 11, 2011 (Mar. 11, 2011), XP055164920, Retrieved from the Internet: URL:http://ieee802.org/16/m2mjcontrib/C80216p-110042r1.doc [retrieved on Jan. 26, 2015], p. 2. lines 8-13.

Ting Lin et al: 11 IEEE C80216p-11/0028r2 1, Project IEEE 802.16 Broadband Wireless Access Working Group <http://ieee802.org/16> Title Addressing for M2M Devices and Corresponding Masking Schemes of A-A-Map IEs Date Submitted Mar. 14, 2011 Source(s) Vi- Addressing for M2M Devices and Corresponding Masking Schemes of A-A-MA 11, Mar. 14, 2011 (Mar. 14, 2011), XP055164922, Retrieved from the Internet: URL:http://ieee802.org/16/m2mjcontrib/C80216p-11 0028r2.doc [retrieved on Jan. 26, 2015], p. 3, line 5.

* cited by examiner

DIFFERENTIATING FIXED DEVICES FROM MOBILE DEVICES IN MOBILE BROADBAND NETWORKS

BACKGROUND

This relates to mobile broadband networks.

Broadband networks may be populated by large numbers of machine-to-machine devices. A portion of the machine-to-machine devices may have mobile broadband access. It is expected that a major portion of these machine-to-machine devices will be fixed devices of the type used, for example as parking meters, surveillance cameras, and other non-mobile applications.

DETAILED DESCRIPTION

A mobile broadband technology may differentiate fixed and mobile devices. Serving fixed devices in a network optimized for mobile devices is inefficient with respect to air interface signaling, device battery power, and capacity points of views. By differentiating between fixed and mobile devices, more efficient management of networks with large numbers of devices, such as machine-to-machine devices, may be achieved.

In order to differentiate between devices that are fixed and mobile, fixed devices may be identified. A fixed device is a wireless device whose location does not change with time. There are a number of mechanisms that can be used to identify fixed, as opposed to mobile, devices. If the device location does not change with time, this indicates that the device is a fixed device. The device location can be derived from global positioning systems, indoor positioning, Global Navigation Satellite Systems (GNSS), and cellular triangulation, to mention a few examples. If the device location is checked a number of times and is still the same over sufficiently long time periods, the device can be identified as one that is a fixed device. A mobile broadband network or a machine-to-machine server can obtain position information from the device in order to decide if it is a fixed device.

Another way to identify fixed devices is based on the device function. If the device's function is one that indicates that it is a fixed device, this notification can be provided to the global broadband network or machine-to-machine server. For example, a device that is a parking meter is known to be a fixed device.

As another example, if the device has an onboard accelerometer, the output from the accelerometer can be identified to determine that the device is being used as a fixed device.

Still another example is using the received signal strength or received power levels. If the received signal strength or received power level does not change by more than a threshold over a given time period, the device can be classified as being fixed.

Other activities that can be monitored to determine whether a device moves include determining activities, such as manual inputs and periodic versus non-periodic activities, to mention a few examples.

Figure 1:
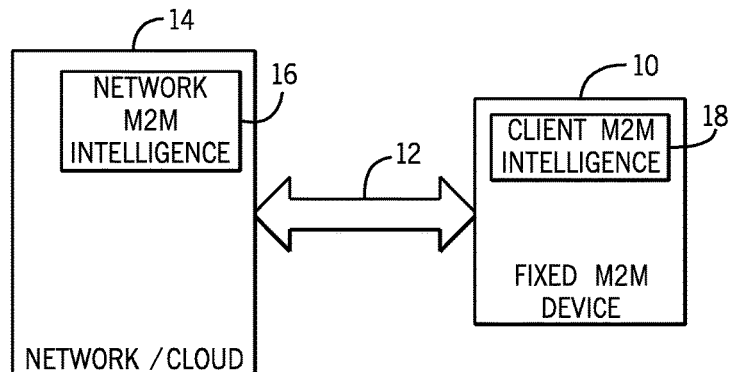
FIG. 1 is a schematic depiction of one embodiment of the present invention.
Figure 2:
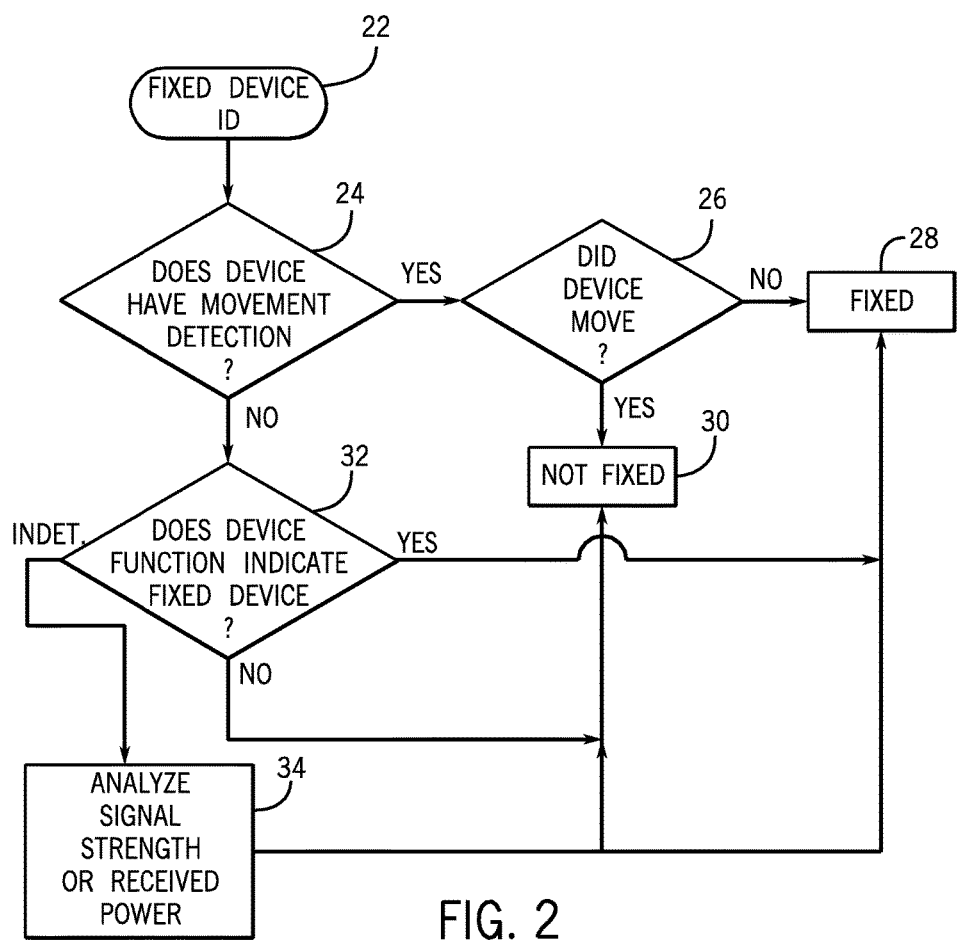
FIG. 2 is a sequence for identifying fixed devices in a mobile broadband network in accordance with one embodiment.

Thus, referring to FIG. 1, network or cloud server 14 may communicate with a fixed machine-to-machine device 10 in one embodiment. The present invention, however, is not limited to machine-to-machine devices and applies to any device in a broadband wireless network. The network may include machine-to-machine intelligence 16 for managing a large number of machine-to-machine devices, both fixed and mobile. The network or cloud server communicates over a communication medium that includes a wireless transmission path 12. Each fixed machine-to-machine device 10 includes a client machine-to-machine (M2M) intelligence 18.

In one embodiment, the client machine-to-machine intelligence may include the sequence 22 for identifying whether the device is a fixed device. However, the identification can also be undertaken in the network machine-to-machine intelligence 16, in some embodiments.

The sequence 22 may be implemented in software, firmware, and/or hardware. In software and firmware embodiments, the sequence may be implemented by computer executable instructions stored on a non-transitory computer readable medium, such as an optical, magnetic, or semiconductor storage.

The sequence 22 begins by checking, at diamond 24, whether the device has movement detection. This can include an accelerometer or global positioning system or any other device suitable for determining machine movement. If the device does have such a movement detection mechanism, a check at diamond 26 determines whether the device has moved over a given period of time. If not, the device is deemed fixed at block 28. If the device did move, it can be deemed to be a mobile (not fixed) device at block 30.

If the device does not have movement detection, then a check at diamond 32 may determine whether the device function indicates a fixed device. If so, the device can be deemed fixed at block 28. On the other hand, if the device function indicates that it is not a fixed device, then the device is deemed not fixed at block 30. As an example, a cellular telephone would be a function that would indicate that the device is not fixed.

However, if the device function is indeterminate (indet.) with respect to whether or not the device is fixed, the signal strength and/or received power can be analyzed at block 34 in order to determine whether the device is fixed or not.

Once it is known whether the device is a fixed device, various mechanisms may be used to differentiate this device from mobile devices. Current Third Generation Partnership Project (3GPP) standards support machine-to-machine adopted one bit to identify the device as being delay tolerant, namely as a machine-to-machine device. This bit can be extended or similar identifications can be introduced to differentiate the fixed devices. As another embodiment, separate device types may be used to identify fixed machine-to-machine devices.

As still another alternative, there are several radio network temporary identifiers defined in the 3GPP standards for various purposes. 16-bit radio network temporary identifiers (RNTIs) for the user equipment identity in a cell for a Radio Resource Control (RRC) connection, 16-bit Random Access-RNTI (RA-RNTI) for random access, 16-bit Paging- RNTI (P-RNTI) for paging, 16-bit System Information-RNTI (SI-RNTI) for system information message already exist. A specified portion of the cell-RNTI (C-RNTI) can be allocated for fixed devices. Namely, any device that has a C-RNTI from a certain portion can be identified as a fixed device. Similarly, a portion of the RA-RNTI, P-RNTI or SI-RNTI can be allocated to indicate that a device is a fixed device.

Still another possibility is that the user equipment client machine-to-machine intelligence 18 of FIG. 1 knows that it is a fixed device and so notifies the network or cloud server 14 in FIG. 1. Another possibility is that the network machine-to-machine intelligence function identifies that it is a fixed device and notifies the user equipment explicitly or implicitly via specific identifiers, as already described.

Figure 3:
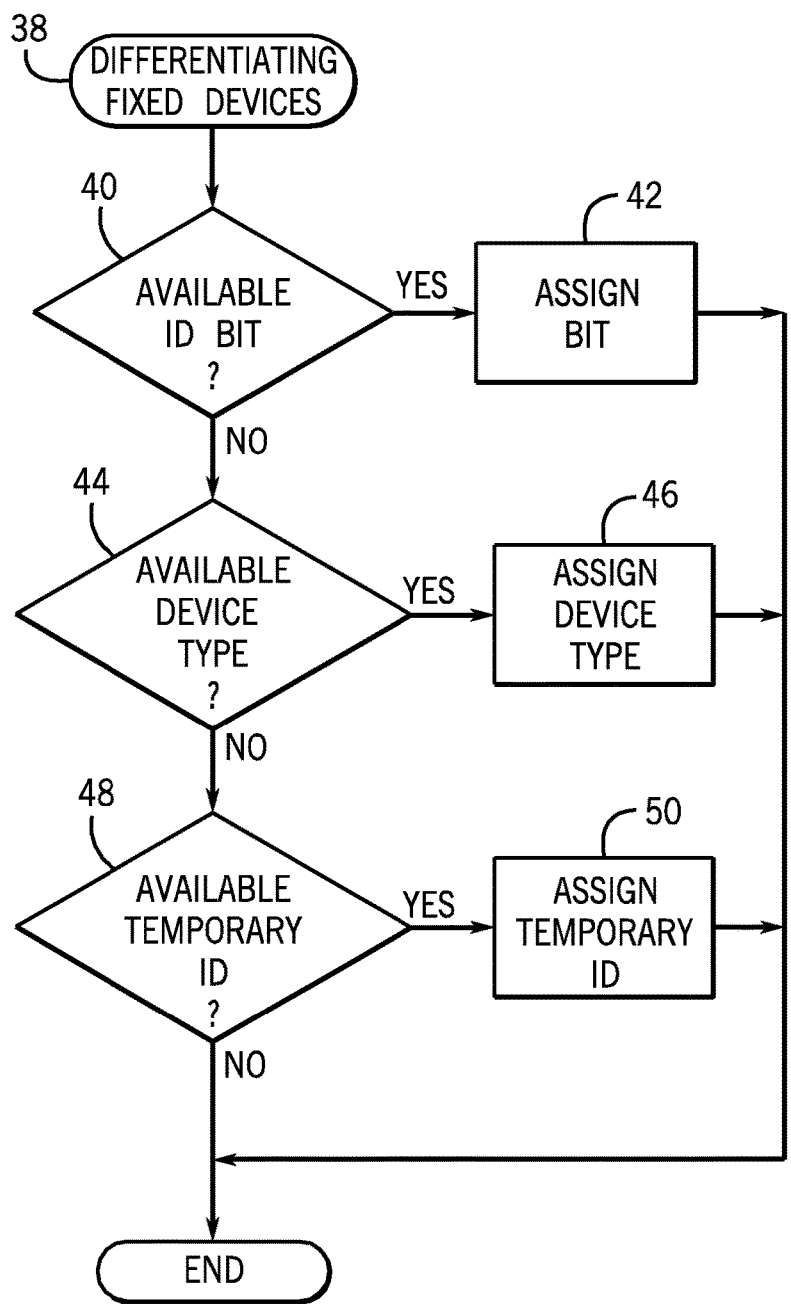
FIG. 3 is a flow chart for differentiating fixed devices in accordance with one embodiment of the present invention.

Thus, referring to FIG. 3, the sequence 38 may be used for differentiating fixed devices. The sequence may be implemented in hardware, software, and/or firmware. In software and firmware embodiments, it may be implemented in non-transitory computer executed media, such as optical, magnetic, or semiconductor memories. It can be implemented in the fixed device or the network or cloud server, for example.

A check at diamond 40 determines whether there is an available identifier bit. If so, the bit is assigned at block 42. Otherwise, a check at diamond 44 determines whether there is an available device type. If so, the device type is assigned to indicate a fixed status in block 46. If not, a check at diamond 48 determines whether there is a temporary identifier that is available. If so, the temporary identifier is assigned at block 50.

In some cases, the number of identifiers may be relatively small compared to the number of fixed devices. Given the vast number of fixed machine-to-machine devices that are expected, it is possible for a network to reject any further devices, fixed or otherwise, since the network may run out of identifiers to assign. In order to increase the possible number of identifiers, the identifier space may be expanded. This may be done, for example by increasing the number of bits assigned to temporary identifier spaces, for example by extending the 16-bit C-RNTI to 32 bits.

As another option, identifiers can be given a lifetime. Once the network identifies that a device is of a fixed type, the network may attach a lifetime value to all identifiers assigned to this device. The lifetime value indicates a length of time for which the identifiers are valid for that particular device and then they expire. This lifetime enables the network to free up identifiers after a certain amount of time and also allows the network to keep a supply of such identifiers available. In addition, if the network reserves a subset of the identifier space for fixed machine-to-machine devices, it can ensure that only those identifiers have this lifetime value assigned to them. But some devices may be accessed for a time period shorter than that indicated by the lifetime. In such cases, the devices may transition to an idle mode before the lifetime expires, which may automatically free up the identifier.

As still another mechanism for increasing the flexibility, with respect to device identifiers, the current mechanisms of assigning temporary identifiers may be modified for fixed devices that are going to be in the cell effectively permanently. Every time the device powers up and gets connected, the device needs to go through the process of exchanging messages and processing to assign temporary identifiers. This constant assigning of identifiers consumes power and air-interface/network resources. Instead, it may be advantageous to assign semi-temporary or semi-static identifiers that are with the device even when the device powers off and loses the RRC connection.

Still another embodiment is to do time division multiplexing. The connection time for different devices may be separated by time. As an example, half of the devices may be connected during one half of the available time period and the other half of the devices may be connected in the other half of the time period. The whole RNTI space is then used in the first period and again in the second period. In this way, it is possible to double the number of fixed devices that can be allocated. By doing an appropriate time division multiplexing, the identifier space can be increased multiple times.

Figure 4:
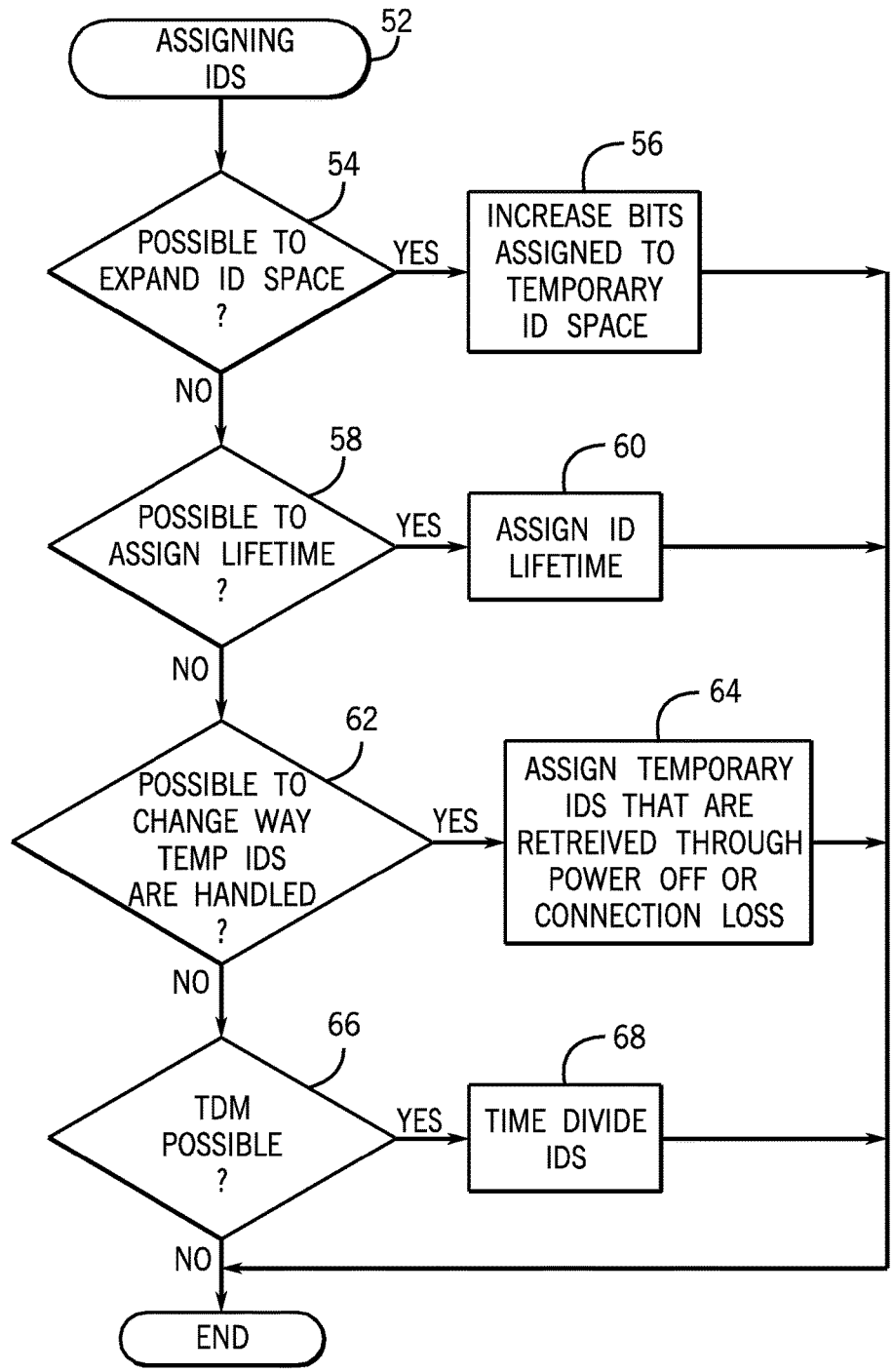
FIG. 4 is a flow chart for assigning identifiers for fixed devices in a mobile broadband network in accordance with one embodiment.

Referring to FIG. 4, a sequence for assigning identifiers 52 may be implemented in hardware, software, and/or firmware. In software and firmware embodiments, it may be implemented by computer executed instructions stored on a non-transitory computer readable medium, such as an optical, magnetic, or semiconductor memory.

The sequence 52 may begin by checking whether it is possible to expand the identifier space at diamond 54. If so, the number of bits assigned to a temporary identifier space may be increased, as indicated in block 56.

If not, a check at diamond 58 determines whether it is possible to assign lifetimes to the identifiers. If so, the identifier lifetime may be assigned to block 60. The identifier may be assigned using a bidirectional message exchange over an air interface.

Otherwise, a check at diamond 62 determines whether it is possible to change the way temporary identifiers are handled. If so, temporary identifiers may be assigned that are retrieved through power off or connection loss, as indicated in block 64.

As still another possibility, a check at diamond 66 determines whether time division multiplexing is possible. If so, the time may be divided among the identifiers, as indicated in block 68.

In some embodiments, the sequence 52 may be implemented in the network machine-to-machine intelligence 16.

Figure 5:
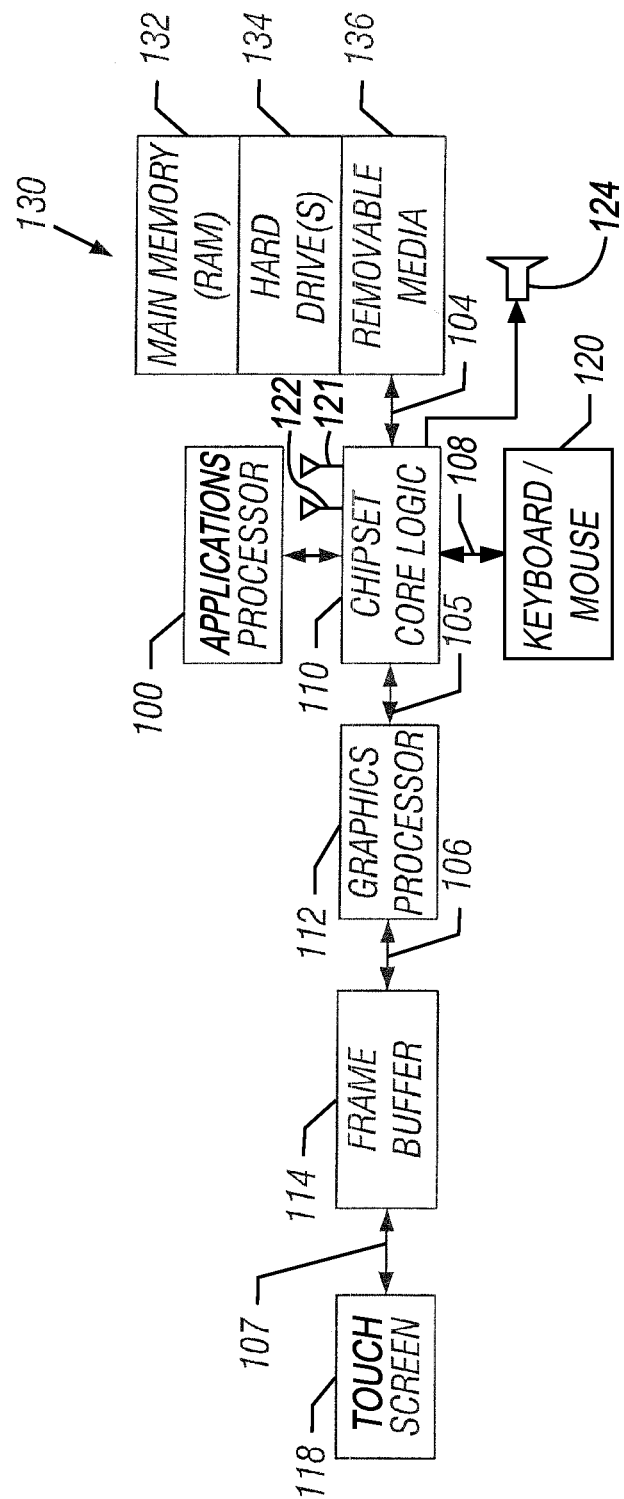
FIG. 5 is a system depiction for one embodiment.

The computer system 130, shown in FIG. 5, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the applications processor 100 in one embodiment. The graphics processor 112 may also be coupled by a bus 106 to a frame buffer 114. The frame buffer 114 may be coupled by a bus 107 to a display screen 118, such as a liquid crystal display (LCD) touch screen. In one embodiment, a graphics processor 112 may be a multi-threaded, multi-core parallel processor using single instruction multiple data (SIMD) architecture.

The chipset logic 110 may include a non-volatile memory port to couple the main memory 132. Also coupled to the logic 110 may be multiple antennas 121, 122 to implement multiple input multiple output (MIMO) in one embodiment. Speakers 124 may also be coupled through logic 110.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   automatically determining whether a device in a broadband wireless machine-to-machine network is a fixed device that never moves; and
   in response to the determination that the device is a fixed device determining whether the device's identifier space can be expanded, and if so, increasing the identifier space, and assigning an identifier to indicate that the device is a fixed device using a message exchange over an air interface.

2. The method of claim 1 wherein automatically determining includes detecting whether the device moves.

3. The method of claim 1 wherein automatically determining includes analyzing a function of the device.

4. The method of claim 1 wherein automatically determining includes analyzing whether signal strength or received power changes by more than a threshold over a predetermined length of time.

5. The method of claim 1 wherein assigning includes checking for an available identifier.

6. The method of claim 1 wherein assigning includes checking for an available device type.

7. The method of claim 1 wherein assigning includes checking for an available temporary identifier.

8. The method of claim 1 wherein assigning includes determining whether it is possible to expand an identifier space.

9. The method of claim 1 wherein assigning includes determining whether a lifetime can be assigned to an identifier.

10. The method of claim 1 wherein assigning includes changing the way temporary identifiers are handled.

11. The method of claim 1 wherein assigning includes using time division multiplexing.

12. The method of claim 1 including analyzing activity on the device to determine if it is a fixed device.

13. A non-transitory computer readable medium storing instructions executed to:
    determine whether a device in a broadband wireless machine-to-machine network is a fixed device that never moves; and
    if the device is a fixed device determining whether the device's identifier space can be expanded, and if so, increasing the identifier space, and use a message exchange over an air interface to assign an identifier indicating that the device is a fixed device.

14. The medium of claim 13 further storing instructions to detect whether the device moves to determine if the device is a fixed device.

15. The medium of claim 13 further storing instructions to analyze a function of the device to determine if the device is a fixed device.

16. The medium of claim 13 further storing instructions to analyze whether signal strength or received power changes by more than a threshold over a predetermined length of time to determine if the device is a fixed device.

17. The medium of claim 13 further storing instructions to check for an available identifier, check for an available device type, check for an available temporary identifier, determine whether it is possible to expand an identifier space, or determine whether a lifetime can be assigned to an identifier.

18. The medium of claim 13 further storing instructions to change the way temporary identifiers are handled.

19. The medium of claim 13 further storing instructions to use time division multiplexing.

20. The medium of claim 13 further storing instructions to analyze activity on the device to determine if it is a fixed device.

21. An apparatus comprising:
    a processor to determine whether a wireless machine-to-machine device is fixed or mobile, if the device is a fixed device to determine whether the device's identifier space can be expanded, and if so, increase the identifier space, assign an identifier to the device to indicate that the device is a fixed device that never moves, said identifier assigned using a message exchange over an air interface; and
    a storage coupled to said processor.

22. The apparatus of claim 21 wherein said device is a server.

23. The apparatus of claim 21 wherein said processor to determine whether the device is fixed or not by detecting whether the device moves.

24. The apparatus of claim 21 wherein said processor to determine whether the device is a fixed device by analyzing a function of the device.

25. The apparatus of claim 21 wherein said processor to determine whether the device is a fixed device by analyzing signal strength on received power.

26. The apparatus of claim 21 wherein said processor to assign an identifier by checking for available identifiers, check for an available device type, checking for an available temporary identifier, or determine whether it is possible to expand an identifier space.

27. The apparatus of claim 21 wherein said processor to assign an identifier by determining whether a lifetime can be assigned to an identifier.

28. The apparatus of claim 21, said processor to assign an identifier using time division multiplexing.

29. The apparatus of claim 21 including a touch screen.

* * * * *